(12) United States Patent
Odagaki (10) Patent No.: US 12,538,464 B2
(45) Date of Patent: Jan. 27, 2026

(54) ELECTRONIC DEVICE

(71) Applicant: CANON KABUSHIKI KAISHA, Tokyo (JP)

(72) Inventor: Koichi Odagaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 18/618,129

(22) Filed: Mar. 27, 2024

(65) Prior Publication Data

US 2024/0341070 A1   Oct. 10, 2024

(30) Foreign Application Priority Data

Apr. 7, 2023   (JP) ................................ 2023-063053

(51) Int. Cl.
*H05K 9/00*   (2006.01)
*G06F 1/16*   (2006.01)

(52) U.S. Cl.
CPC ............ *H05K 9/002* (2013.01); *G06F 1/163* (2013.01); *G06F 1/1698* (2013.01); *H05K 9/0037* (2013.01); *H05K 9/0054* (2013.01)

(58) Field of Classification Search
CPC .................................................. H05K 9/0037
See application file for complete search history.

(56) References Cited

U.S. PATENT DOCUMENTS

| | | | | |
|---|---|---|---|---|
| 6,608,251 B1 * | 8/2003 | Nurmi | .................. | H05K 9/0016 361/752 |
| 8,760,879 B1 * | 6/2014 | Platt | ..................... | H05K 1/0215 361/752 |
| 2015/0048675 A1 * | 2/2015 | Fujii | ....................... | H02M 1/12 307/10.1 |
| 2016/0057403 A1 * | 2/2016 | Hayakawa | ........... | H04N 25/617 348/46 |
| 2019/0067925 A1 * | 2/2019 | Tsuchida | ................ | H02G 3/081 |

FOREIGN PATENT DOCUMENTS

JP   2023036737 A   3/2023

* cited by examiner

*Primary Examiner* — Hung V Ngo
(74) *Attorney, Agent, or Firm* — Cowan, Liebowitz & Latman, P.C.

(57) ABSTRACT

In order to provide an electronic device capable of reducing noise, an electronic device such as an HMD includes: a first flexible wiring member; a second flexible wiring member; an accommodating member that accommodates the first flexible wiring member and the second flexible wiring member inside the accommodating member and is molded by a resin; a separation wall that is disposed between the first flexible wiring member and the second flexible wiring member and is molded integrally with the accommodating member; and a shield electrode pattern that is formed by an MID on a surface of the separation wall.

9 Claims, 8 Drawing Sheets

ELECTRONIC DEVICE

BACKGROUND OF THE INVENTION

Field of the Invention

The present invention relates to an electronic device or the like such as an HMD, for example.

Description of the Related Art

Sizes and weights of head-mounted-type display devices such as head mount displays (HMDs) continue to decrease, and for example, Japanese Patent Laid-Open No. 2023-036737 describes a head-mounted-type display device with a configuration in which display units are disposed on sides of the face, and light of images on the display units is guided to guide the images to the eyes of a wearer.

However, many wirings for a flexible circuit board and the like are generally used between a liquid crystal display or the like serving as a display element and a control circuit in a head-mounted-type display device, and further, wirings and the like for external terminals are also disposed inside the device. These signal wiring members that are easily deformed may come into contact with or approach each other depending on utilization conditions, and there is thus a concern of them giving noise to each other.

Particularly, the problem described above is likely to occur as a result of further size and weight reduction. However, head-mounted-type display devices in the related art do not have sufficient measures against occurrence of such noise.

SUMMARY OF THE INVENTION

An electronic device according to an aspect of the present invention includes: a first flexible wiring member; a second flexible wiring member; an accommodating member that accommodates the first flexible wiring member and the second flexible wiring member inside the accommodating member and is molded by a resin; a separation wall that is disposed between the first flexible wiring member and the second flexible wiring member and is molded integrally with the accommodating member; and a shield electrode pattern formed by an MID on a surface of the separation wall.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
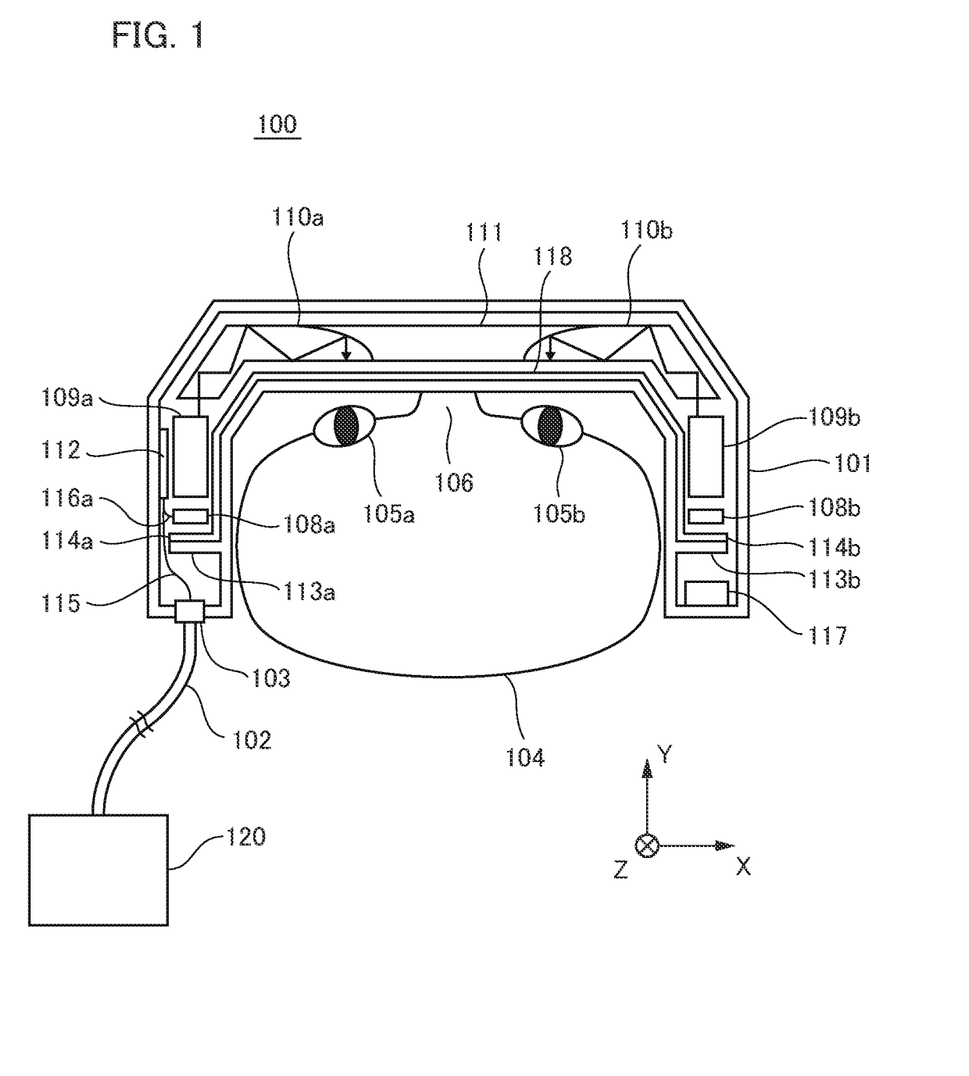
FIG. 1 a schematic view illustrating a configuration example of a head-mounted-type display device according to a first embodiment of the present invention from above a head.

FIG. 1 is a schematic view illustrating a configuration example of a head-mounted-type display device in a first embodiment of the present invention from above a head. Note that although an example of a head mount display (HMD) 100 as the head-mounted-type display device as illustrated in FIG. 1 will be described as an electronic device in the first embodiment, the electronic device in the first embodiment is not limited to the HDM.

In FIG. 1, 101 is a casing of an HMD 100 as an example of a head-mounted-type display device and is configured by assembling a plurality of units molded from a resin. An external terminal is denoted by 120, which incorporates a CPU as a computer and a memory as a storage medium that stores a computer program, for example.

Also, the external terminal 120 incorporates, for example, a wireless communication unit and includes a video storage unit that stores a video downloaded via the wireless communication unit from a network, for example. The external terminal 120 is connected to the HMD 100 via a wired cable 102 and a connector 103, for example.

A head is denoted by 104, 105a and 105b denote a left eyeball and a right eyeball, respectively, and 106 schematically illustrates a nose. Note that although the casing 101 of the HMD in the first embodiment is mounted on the head by a belt, a hook, a nose pad, or the like, a structure for mounting it on the head is known and is not illustrated in the drawing.

Display elements such as LCDs, for example, are denoted by 108a and 108b, and 109a and 109b denote image forming optical systems for forming images displayed by the display elements 108a and 108b, respectively. Light guiding optical systems for guiding light of the images formed by the image forming optical systems 109a and 109b to the eyeballs 105a and 105b are denoted by 110a and 110b, which may have power as lenses.

Note that light of the images displayed by the display elements 108a and 108b is guided to the eyeballs 105a and 105b via the image forming optical systems 109a and 109b and the light guiding optical systems 110a and 110b, respectively. Here, the light guiding optical system 110a forms a display unit for the left eye, and the light guiding optical system 110b configures a display unit for the right eye. Note that the arrows inside the light guiding optical systems 110a and 110b illustrated in the drawing schematically illustrate how the light is guided.

A light transmitting member is denoted by 111. A control board is denoted by 112, and the control board includes a control circuit or the like such as a CPU. The control board 112 is for controlling the entire circuit in the HMD 100, and the control board 112 and the display elements 108a and 108b are electrically connected on flexible printed wiring boards (hereinafter, abbreviated as FCBs) 116a and 116b, respectively.

Here, the FCBs 116a and 116b function as a first flexible wiring member, and a control signal for controlling the display elements flows through the first flexible wiring member. Also, a wiring 115 as a second flexible wiring member is provided between the control board 112 and the connector 103, and a communication signal with an external device flows through the second flexible wiring member.

In this manner, the FCBs 116a and 116b serving as the first flexible wiring member and the wiring 115 serving as the second flexible wiring member are accommodated inside the casing 101 serving as an accommodating member molded by a resin. Note that the FCB 116b that is a wiring between the control board 112 and the display element 108b is omitted in FIG. 1.

Separation walls are denoted by 113a and 113b, and the separation wall 113a curbs noise (crosstalk) occurring between the FCB 116a and the wiring 115 by separating the FCB 116a from the wiring 115.

Also, the separation wall 113a is disposed between the FCB 116a serving as the first flexible wiring member and the wiring 115 serving as the second flexible wiring member and is molded integrally with the casing 101 serving as the accommodating member.

In other words, the separation walls 113a and 113b are molded as parts of the casing 101 made of a resin. Also, shield surfaces 114a and 114b as shield electrode patterns are formed on surfaces of the separation walls 113a and 113b on one side made of a resin, respectively, by a molded interconnect device (MID). In other words, the shield surface 114a is included as a shield electrode pattern formed by the MID on the separation wall 113a.

Note that the molded interconnect device (MID) is an electrode, a circuit, or the like formed on a surface of a resin-molded article with a three-dimensional shape. Also, as MID production methods, there are a method of forming wirings through plating and in-mold electronics (IMS) of integrating a circuit with a film shape through insert molding.

The shield surfaces 114a and 114b are in the thin film-shaped forms, for example, of a metal, and the shield surface 114a enhances an effect of curbing noise between the FCB 116a and the wiring 115. Note that the shield surfaces 114a and 114b may be in a mesh-shaped form or a grip-shaped form of a metal.

Note that the shield surfaces 114a and 114b as shield electrode patterns are formed on surfaces of separation walls 113a and 113b only on one side rather than both surfaces of the separation walls 113a and 113b, respectively. This reduces the parasitic capacitance.

Note that 113b denotes a separation wall that is similar to 113a and is provided to separate the FCB 116b, which is not illustrated, in the surroundings of the display element 108b and a wiring, which is not illustrated, for a peripheral circuit board 117. Also, the shield surface 114b enhances an effect of curbing noise (crosstalk) occurring between the FCB 116b and the wiring, which is not illustrated, for the peripheral circuit board 117.

In FIG. 1, the shield surfaces 114a and 114b are electrically connected by a shield surface (shield electrode) 118 formed by an MID on an inner wall surface, for example, of the casing 101 made of a resin in a similar manner. Also, the shield surfaces 114a, 114b, and 118 are electrically connected to a ground electrode (GND electrode), which is not illustrated, of electric circuits included in the control board 112, the display elements 108a and 108b, the peripheral circuit board 117, and the like.

In other words, a ground electrode of the control circuit and the like is electrically connected to the shield electrode patterns formed by an MID on the accommodating member. Furthermore, the shield surface 118 is disposed along the FCB 116b and is connected to a ground electrode wiring provided inside the FCB 116b.

In this manner, it is possible to curb occurrence of noise (crosstalk) by providing the shield surfaces 114a, 114b, and 118 formed by an MID on the surface of the casing 101 made of a resin in the first embodiment. Therefore, it is possible to display an image with stable image quality and to further adapt it to the EMI standard and the like.

Moreover, since the shield surfaces 114a, 114b, and 118 are formed by the MID on the surface such as the inner wall of the casing 101 made of a resin, it is possible to sufficiently secure areas of the shield surfaces 114a, 114b, and 118 even if the inner wall of the casing structure has a complicated uneven shape.

Figure 2:
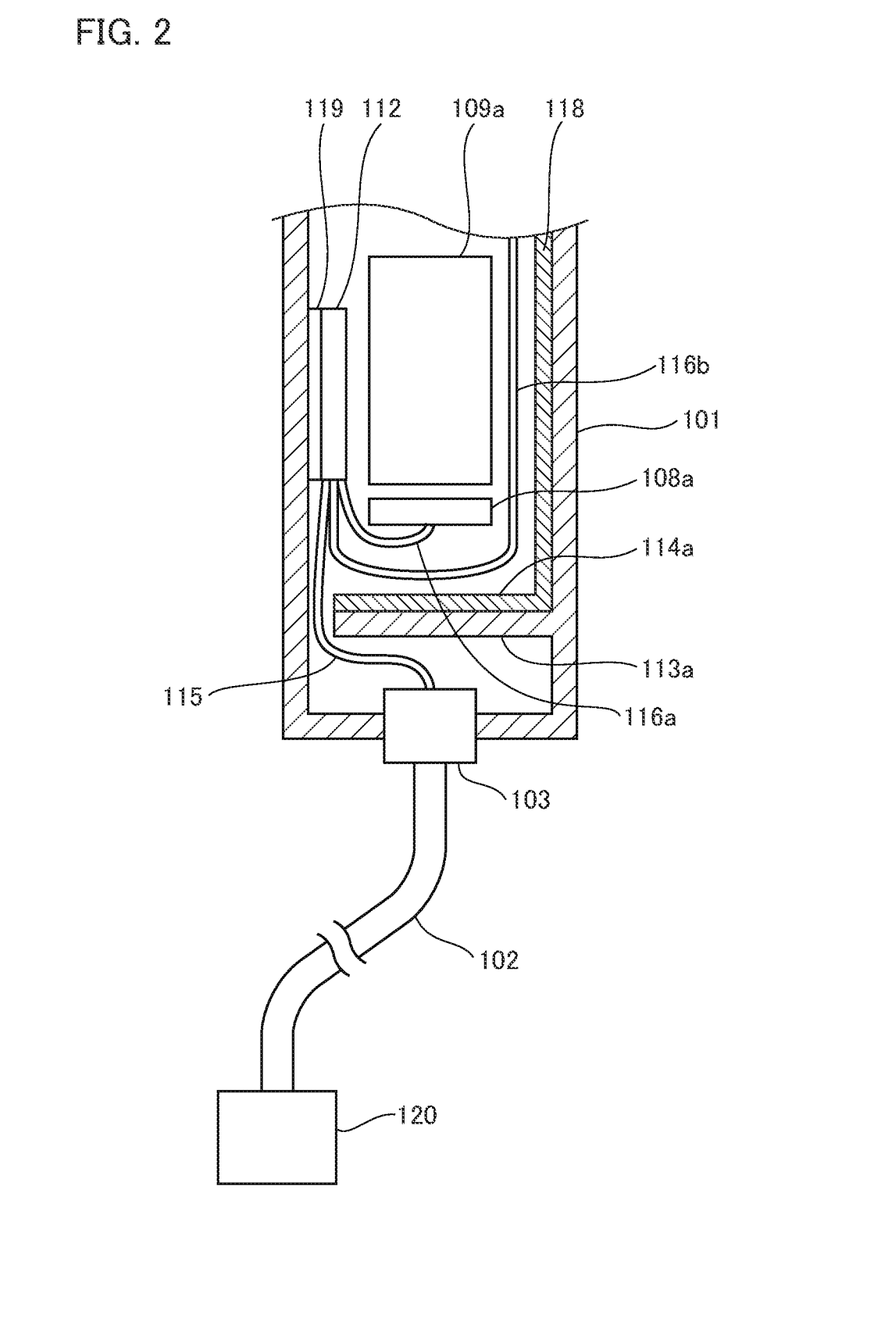
FIG. 2 is an enlarged schematic sectional view of surroundings of a control board 112.

FIG. 2 is an enlarged schematic sectional view of the control board 112. As illustrated in FIG. 2, the FCB 116b that is a wiring between the control board 112 and the display element 108b is provided. Also, 119 denotes an antenna that is electrically connected to a wireless communication unit, which is not illustrated, inside the control board 112 for enhancing a transmission function when radio waves are transmitted from the control board 112 to the outside.

Note that the antenna 119 is formed by an MID on the surface, such as the inner wall, of the casing 101 made of a resin. Also, the antenna 119 and the control board form a two-layer structure, and the antenna 119 is sandwiched between the control board 112 and the inner wall of the casing 101 in FIG. 2.

However, both the control board and the antenna may be formed by an MID on the surface, such as the inner wall, for example, of the casing 101 made of a resin. In other words, the control circuit (control board) may be formed by the MID on the surface of the casing as an accommodating member. It is thus possible to achieve further size reduction.

Note that the antenna 119 is formed inside the casing 101 and on the surface such as the inner wall on a side far from the head 104 and the shield surface 118 is formed on the surface, such as the inner wall, of the casing 101 on a side close to the head 104 in the first embodiment.

In other words, a shield electrode pattern is provided by an MID at an inside surface of a casing of which outside surface comes into contact with a user when the user wears the electronic device and the shield electrode pattern is formed by an MID between the user and the antenna. Therefore, an effect by which it is possible to considerably reduce influences of electromagnetic wave noise of the antenna 119 on human bodies is also exhibited.

Second Embodiment

Figure 3:
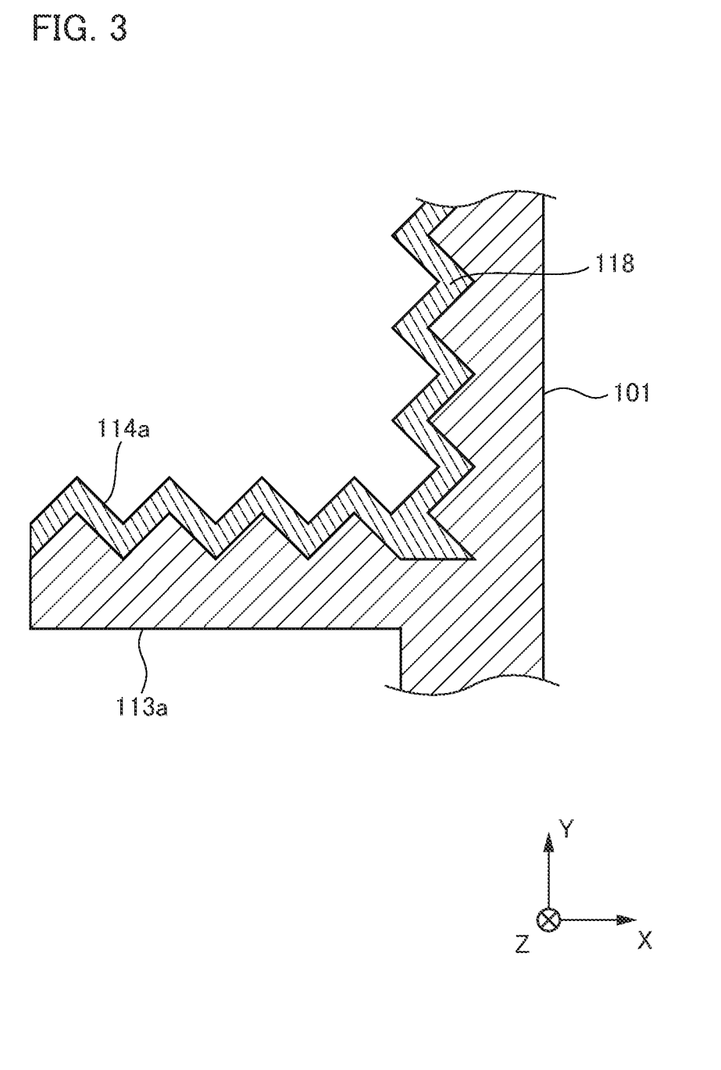
FIG. 3 is a schematic view illustrating an example of a separation wall in a second embodiment.

FIG. 3 is a schematic view illustrating an example of separation wall in a second embodiment. As illustrated in FIG. 3, one surface of the separation wall 113a may be an uneven surface. Also, the shield surface 114a may be configured to be formed by an MID on the surface of the uneven surface of the separation wall 113a on one side. It is possible to form the shield surface 114a with a desired area even on such a complicated surface by using the MID.

Also, since unevenness is provided on the surface of the separation wall on the side on which the shield surface 114a as a shield electrode pattern is provided, it is possible to reduce the contact area between the FCBs 116a and 116b or an area of the part where the FCBs 116a and 116b approach each other, for example. It is thus possible to reduce the parasitic capacitance (coupling capacitance) for the FCBs 116a and 116b and to curb unsharpened signal waveforms and the like. Note that it is only necessary that the unevenness to be formed at least at a part with which the wiring members may come into contact.

In FIG. 3, projecting portions on the separation wall 113a on one side may be formed in a ridge shape on the surface of the separation wall 113a or the like or may be two-dimensionally discretely disposed on the surface of the separation wall 113a or the like.

Third Embodiment

Figure 4:
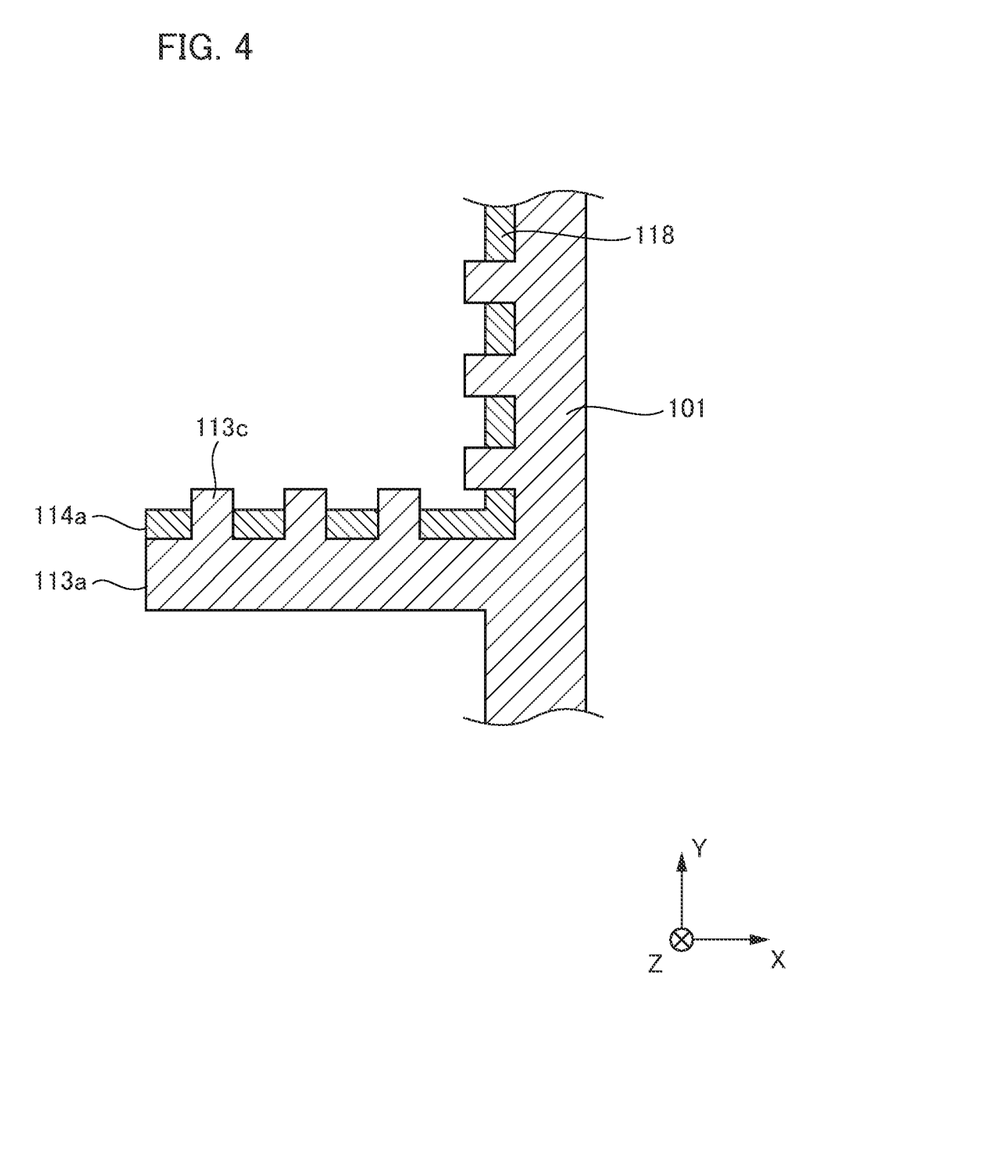
FIG. 4 is a schematic view illustrating another example of a separation wall in a third embodiment.

FIG. 4 is a schematic view illustrating another example of a separation wall in a third embodiment. As illustrated in FIG. 4, one surface of a separation wall 113a may be a surface including projecting portions 113c. Also, the shield surface 114a may be configured to be formed by an MID on surface other than the projecting portions 113c, that is, recessed portions of the separation wall 113a on the one side. It is possible to form the shield surface 114a with a desired area even on such a complicated surface by using the MID.

Since it is possible to reduce the contact area between the FCBs 116a and 116b or the area of the part where the FCBs 116a and 116b approach each other, for example, with such a configuration, it is possible to reduce the parasitic capacitance (coupling capacitance) for the FCBs 116a and 116b and to curb unsharpened signal waveforms and the like.

Note that in FIG. 4, the projecting portions 113c of the separation wall 113a on the one side may be configured in a ridge shape on the surface of the separation wall 113a or may be two-dimensionally discretely disposed on the surface of the separation wall 113a.

Fourth Embodiment

Figure 5:
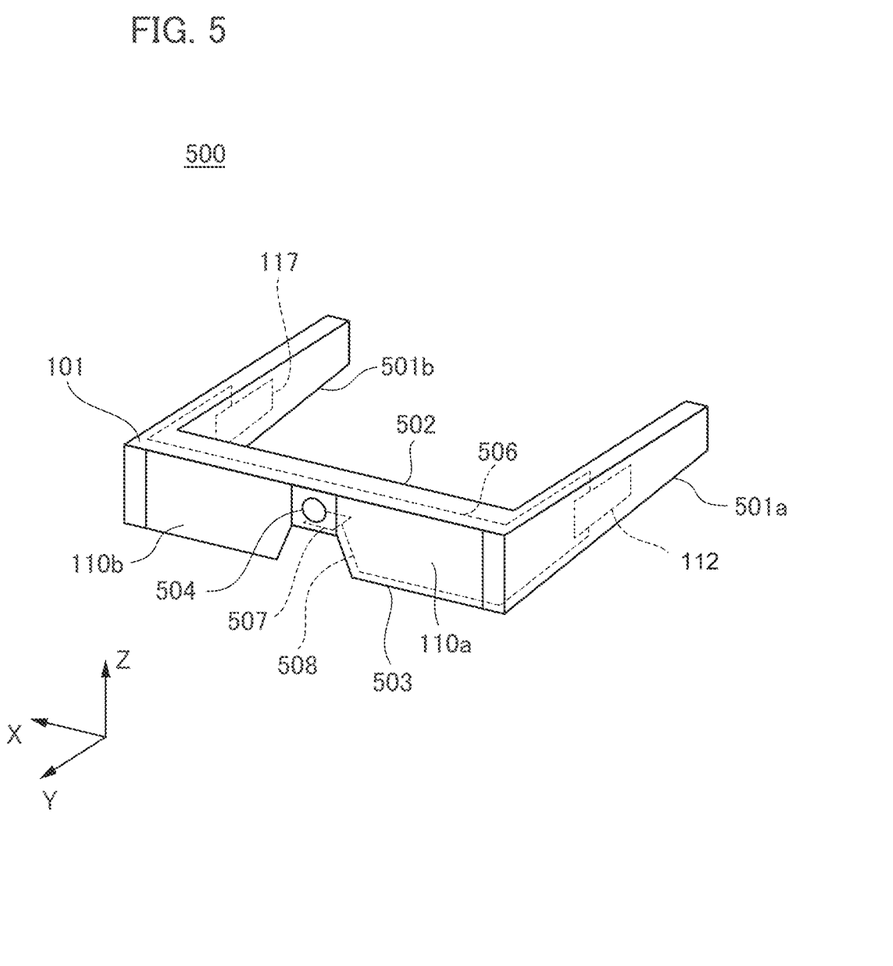
FIG. 5 is a perspective view illustrating a schematic configuration example of an HMD 500 in a fourth embodiment.

FIG. 5 is a perspective view illustrating a schematic configuration example of an HMD 500 in a fourth embodiment. In FIG. 5, 101 denotes a casing made of a resin, 501a and 501b denote head side portions of the HMD, 502 denotes an upper frame of the casing 101, 503 denotes a lower frame of the casing 101, and 110a and 110b denote light guiding optical systems that are similar to those in FIG. 1.

Note that the light guiding optical systems 110a and 110b are sandwiched and held from upper and lower sides by the upper frame 502 and the lower frame 503. Also, the upper frame 502 and the lower frame 503 configure a frame that connects the left and right head side portions 501a and 501b.

Note that display elements 108a and 108b, which are not illustrated, are provided inside the head side portions 501a and 501b, respectively, in a manner similar to FIG. 1. Images displayed on the display elements 108a and 108b are configured to be projected as virtual images via image forming optical systems 109a and 109b, which are not illustrated, and the light guiding optical systems 110a and 110b and be incident on eyeballs 105a and 105b.

A camera included in a frame is denoted by 504, and the camera is for imaging an object in front. The camera 504 incorporates an imaging optical system, a CMOS image sensor, and the like. A camera drive board for driving the camera 504 is denoted by 507. A control board provided inside the head side portion 501a is denoted by 112, and the control board is the same as the control board in FIG. 1. A peripheral circuit board provided in the head side portion 501b is denoted by 117, and the peripheral circuit board is similar to that illustrated in FIG. 1.

In the fourth embodiment, a first wiring is formed by an MID in one of the upper frame 502 and the lower frame 503, while a second wiring is formed by an MID in the other one of them. Specifically, a wiring 506 (first wiring) that connects the control board 112 to the peripheral circuit board 117 is formed by an MID on the surface of the inner wall of the upper frame 502, for example, of the casing 101 of the HMD made of a resin.

In other words, the first wiring formed by the MID is included in the frame in order to establish electrical connection between the control board disposed on a side of one of the head side portions and the circuit board disposed on a side of the other one of the head side portions. Also, a wiring 508 (second wiring) that connects the control board 112 to the camera drive board 507 is formed by an MID on the surface of the inner wall of the lower frame 503, for example, of the casing 101 of the HMD made of a resin. In other words, the second wiring formed by the MID is included in the frame in order to establish electrical connection between the control board 112 and the camera 504.

With such a configuration, it is possible to form the wirings 506 and 508 on the complicated uneven surfaces that are present inside the casing 101 and to thereby realize size reduction of the HMD 500.

Fifth Embodiment

Figure 6:
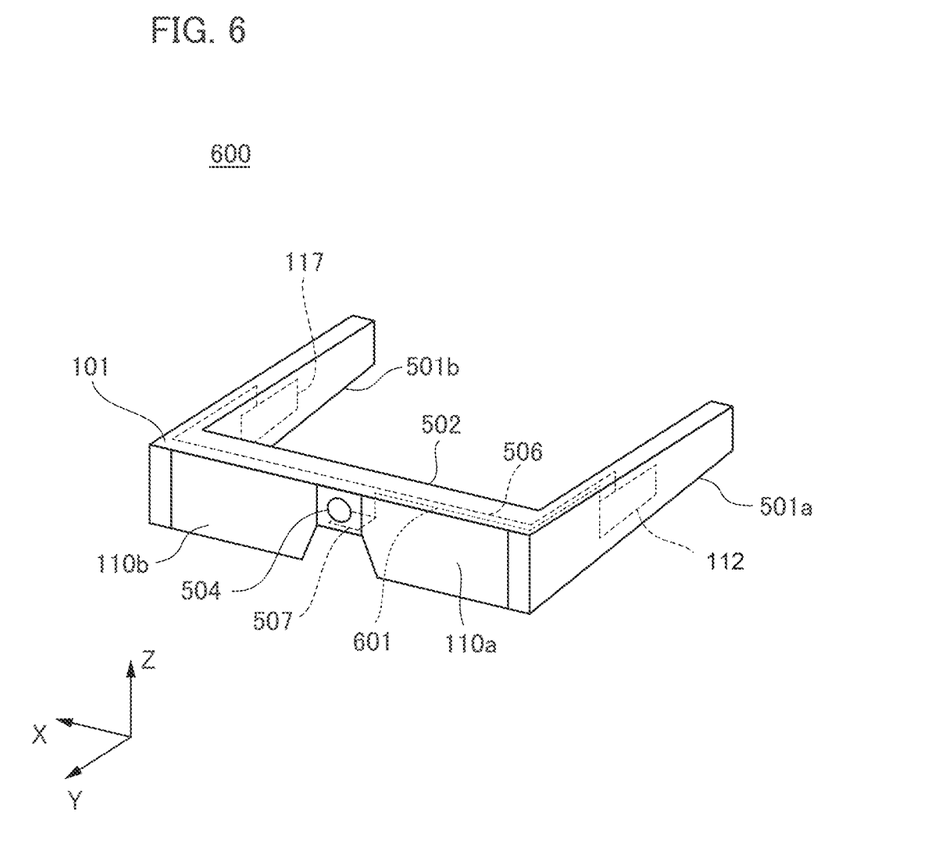
FIG. 6 is a perspective view illustrating a schematic configuration example of an HMD 600 in a fifth embodiment.

FIG. 6 is a perspective view illustrating a schematic configuration example of an HMD 600 in a fifth embodiment.

In the fifth embodiment, a wiring 601 that connects a control board 112 and a camera drive board 507 is formed by an MID on a surface of an inner wall of an upper frame 502, for example, of a casing 101 of the HMD made of a resin. At this time, the wiring 601 and a wiring 506 may be provided on surfaces of the upper frame 502 on the same side or may be provided on surfaces of the upper frame 502 on mutually opposite sides.

Figure 7A:
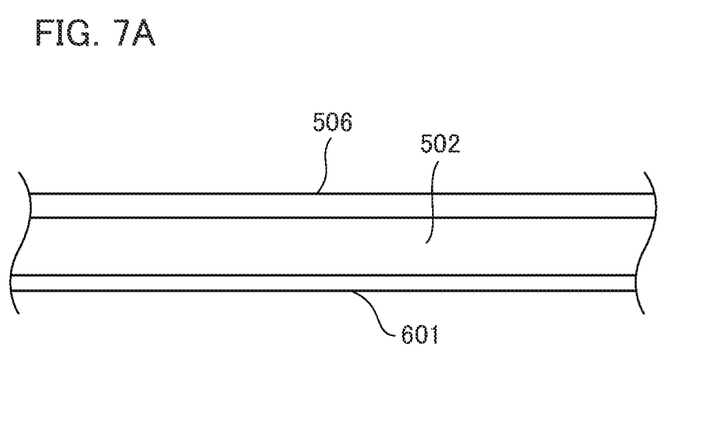
FIGS. 7A and 7B are diagrams for explaining a disposition example of a wiring 506 and a wiring 601.
Figure 7B:
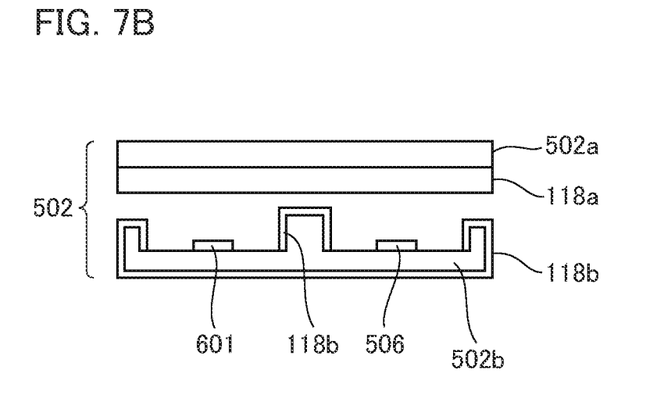

FIGS. 7A and 7B are diagrams for explaining a disposition example of the wiring 506 and the wiring 601, and FIG. 7A is a diagram for explaining an example of a case where the wiring 506 and the wiring 601 are formed by MIDs on surfaces of the upper frames 502 of the casing 101 made of a resin on mutually opposite sides.

In other words, wirings for different connection destinations are formed by MIDs on an upper side surface and a lower side surface of the upper frame, respectively, and further specifically, a first wiring is formed by an MID on the upper side surface of the upper frame 502, while a second wiring is formed by an MID on the lower side surface in the example in FIG. 7A. Note that the casing 101 may further includes, outside the casing 101, a casing or a cover for protection.

FIG. 7B is a sectional view of the upper frame 502 in a Y direction for explaining an example of a case where the wiring 506 and the wiring 601 are formed by MIDs on surfaces of the upper frame 502 of the casing 101 made of a resin on the same side as in FIG. 6.

Note that in the example in FIG. 7B, the upper frame 502 of the casing 101 is configured of a casing 502a on the upper side and a casing 502b on the lower side and a shield surface 118a is formed by an MID on the lower surface of the casing 502a on the upper side. A shield surface 118b is also formed by an MID on a lower surface, a side surface, and a part of an upper surface of the casing 502b on the lower side and a surface of a projection between the wiring 506 and the wiring 601. Note that the shield surface 118b is separated from the wirings 506 and 601.

Also, the casing 502a on the upper side and the casing 502b on the lower side are configured to be coupled by a fastening means, which is not illustrated, and the shield surfaces 118a and 118b are thereby electrically connected. Also, the shield surfaces 118a and 118b are electrically connected to a ground electrode (GND electrode) of each circuit as described above.

Therefore, surroundings of the wiring 506 and the wiring 601 are surrounded by a ground potential by the shield surfaces 118a and 118b, and it is thus possible to curb occurrence of noise. Note that a casing or a cover for protection may be disposed outside the casings 502a and 502b in the case of the example in FIG. 7B as well. Note that the surroundings of the wiring 506 and the wiring 601 may not be completely surrounded by the ground potential by the shield surfaces 118a and 118b.

Sixth Embodiment

Figure 8:
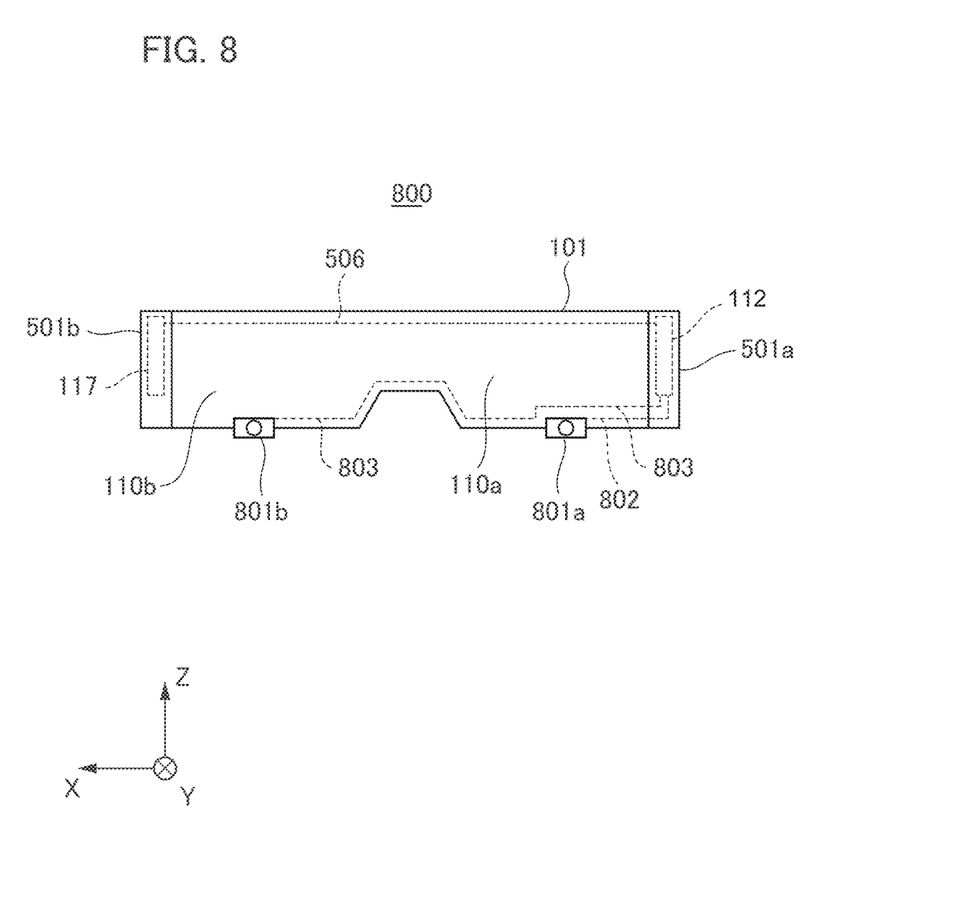
FIG. 8 is a perspective view illustrating a schematic configuration example of an HMD 800 in a sixth embodiment.

FIG. 8 is a perspective view illustrating a schematic configuration example of an HMD 800 in a sixth embodiment. In the sixth embodiment, two cameras are provided. In FIG. 8, 101 denotes a casing, which is made of a resin, of the HMD 800, 501a and 501b denote head side portions of the HMD, and 110a and 110b are light guiding optical systems that are similar to those in FIGS. 1 and 5, for example.

Note that display elements 108a and 108b, which are not illustrated, are provided in the head side portions 501a and 501b similarly to FIG. 1. Images displayed on the display elements 108a and 108b are configured to be projected as virtual images via image forming optical systems 109a and 109b, which are not illustrated, and light guiding optical systems 110a and 110b and be incident on eyeballs 105a and 105b.

In the sixth embodiment, cameras 801a and 801b are disposed below a display unit for a left eye and a display unit for a right eye, respectively. The cameras 801a and 801b are for imaging a stereo image of an object in front, and each of the cameras 801a and 801b incorporates an imaging optical system, a CMOS image sensor, and the like.

A control board provided inside a head side portion 501a is denoted by 112, and the control board is the same as the control board in FIG. 1. A peripheral circuit board provided inside the head side portion 501b is denoted by 117, and the peripheral circuit board is similar to that illustrated in FIG. 1.

A wiring 506 that connects the control board 112 to the peripheral circuit board 117 is formed by an MID on a surface of an inner wall, for example, of an upper frame of the casing 101 of the HMD made of a resin similarly to the first embodiment. Also, wirings 802 and 803 for connecting the control board 112 to the cameras 801a and 801b, respectively, are formed by MIDs on a surface of an inner wall of a lower frame of the casing 101 of the HMD made of a resin.

With this configuration, it is possible to form the wirings 506, 802, and 803 on complicated uneven surfaces that are present in the casing 101 and to thereby realize size reduction of the HMD 800.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the electronic device or the like through a network or various storage media. Then, a computer (or a CPU, an MPU, or the like) of the electronic device or the like may be configured to read and execute the program. In such a case, the program and the storage medium storing the program configure the present invention.

Also, the present invention includes implementation by using at least one processor or circuit configured to function of the embodiments explained above. Note that a plurality of processors may be used and caused to perform distributed processing.

This application claims the benefit of priority from Japanese Patent Application No. 2023-063053, filed on Apr. 7, 2023, which is hereby incorporated by reference herein in its entirety.

What is claimed is:

1. An electronic device comprising:
   a first flexible wiring member;
   a second flexible wiring member;
   an accommodating member that accommodates the first flexible wiring member and the second flexible wiring member inside the accommodating member and is molded by a resin;
   a separation wall that is disposed between the first flexible wiring member and the second flexible wiring member and is molded integrally with the accommodating member; and
   a shield electrode pattern formed by an MID on a surface of the separation wall.

2. The electronic device according to claim 1, wherein the shield electrode pattern is formed on either surface of the separation wall.

3. The electronic device according to claim 1, wherein a control circuit is formed by an MID on a surface of the accommodating member.

4. The electronic device according to claim 1, wherein unevenness is provided on a surface of the separation wall on a side on which the shield electrode pattern is provided.

5. The electronic device according to claim 4, wherein the unevenness is formed on a surface of the separation wall on a side which the wiring members can come into contact.

6. The electronic device according to claim 1, wherein the shield electrode pattern is provided by an MID at an inside surface of a casing of which outside surface comes into contact with a user when the user wears the electronic device.

7. The electronic device according to claim 1, wherein the shield electrode pattern is formed by an MID between a user and an antenna.

8. The electronic device according to claim 1, wherein a ground electrode of a control circuit is electrically connected to the shield electrode pattern formed by an MID on the accommodating member.

9. The electronic device according to claim 1, wherein a control signal that controls a display element flows through the first flexible wiring member, and a communication signal with an external device flows through the second flexible wiring member.

* * * * *